US012420631B2

(12) United States Patent
Mei

(10) Patent No.: US 12,420,631 B2
(45) Date of Patent: Sep. 23, 2025

(54) FUEL TANK

(71) Applicant: TOYOTA JIDOSHA KABUSHIKI KAISHA, Toyota (JP)

(72) Inventor: Zixun Mei, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 509 days.

(21) Appl. No.: 17/898,891

(22) Filed: Aug. 30, 2022

(65) Prior Publication Data

US 2022/0410701 A1 Dec. 29, 2022

Related U.S. Application Data

(63) Continuation-in-part of application No. 17/209,386, filed on Mar. 23, 2021, now Pat. No. 11,638,899.

(60) Provisional application No. 63/122,515, filed on Dec. 8, 2020, provisional application No. 62/993,762, filed on Mar. 24, 2020.

(30) Foreign Application Priority Data

Oct. 8, 2021 (JP) ................. 2021-166471

(51) Int. Cl.
*B60K 15/07* (2006.01)
*B60K 15/03* (2006.01)

(52) U.S. Cl.
CPC .... *B60K 15/07* (2013.01); *B60K 2015/03184* (2013.01); *B60K 2015/0319* (2013.01); *B60K 2015/03315* (2013.01); *F17C 2201/0119* (2013.01); *F17C 2201/058* (2013.01); *F17C 2205/0165* (2013.01); *F17C 2205/037* (2013.01); *F17C 2221/012* (2013.01);
(Continued)

(58) Field of Classification Search
CPC .......... B60L 53/80; B60K 2015/03315; B60K 2015/03184; B60K 15/067; B60K 15/07; B60K 15/03; F17C 2201/0114; F17C 2201/0104–0119; F17C 13/08; F17C 13/084
See application file for complete search history.

(56) References Cited

U.S. PATENT DOCUMENTS 1,572,727 A * 2/1926 Kerr ................. F16K 1/302
222/400.7
2,309,854 A 2/1943 Macsporran
(Continued)

FOREIGN PATENT DOCUMENTS

JP S5953125 U * 4/1984
JP H04143123 A * 5/1992 .............. B60L 50/52
(Continued)

*Primary Examiner* — Mollie Impink
(74) *Attorney, Agent, or Firm* — Dinsmore & Shohl LLP

(57) ABSTRACT

A fuel tank comprises a circular column-shaped fuel tank body, a handle, and a first connector. The circular column-shaped fuel tank body is provided so as to be detachably attachable to a fuel-powered device. The handle is formed on one end side in a length direction of the fuel tank body. The first connector is formed on another end side in the length direction of the fuel tank body and configured such that, by installing the fuel tank body to the fuel-powered device, the first connector is connected to a second connector provided at the fuel-powered device so as to enable fuel to be supplied to the fuel-powered device.

10 Claims, 13 Drawing Sheets

(52) U.S. Cl.
CPC .............. *F17C 2250/0491* (2013.01);
*F17C 2260/015* (2013.01); *F17C 2270/0168*
(2013.01)

(56) References Cited

U.S. PATENT DOCUMENTS

| | | | | |
|---|---|---|---|---|
| 5,709,252 | A * | 1/1998 | Princiotta | F17C 13/084 |
| | | | | 108/55.3 |
| 6,196,255 | B1 * | 3/2001 | Poillucci | F24C 3/062 |
| | | | | 137/259 |
| 6,568,496 | B1 * | 5/2003 | Huang | B62M 7/00 |
| | | | | 180/220 |
| 6,722,460 | B2 * | 4/2004 | Yang | B62M 7/12 |
| | | | | 180/65.245 |
| 8,577,226 | B2 * | 11/2013 | Ozaki | G03G 15/0886 |
| | | | | 399/262 |
| 10,147,984 | B2 * | 12/2018 | O'Hora | H01M 10/486 |
| 10,850,713 | B2 * | 12/2020 | O'Hora | B25J 11/008 |
| 10,916,742 | B2 * | 2/2021 | Sakai | H02J 7/0042 |
| 11,114,731 | B2 * | 9/2021 | Sazarin | H01M 50/213 |
| 2006/0006108 | A1 * | 1/2006 | Arias | H01M 8/04208 |
| | | | | 429/513 |
| 2007/0003825 | A1 * | 1/2007 | Touchton | H01M 50/213 |
| | | | | 429/97 |
| 2009/0268385 | A1 * | 10/2009 | Harbin | H01M 50/202 |
| | | | | 361/679.02 |
| 2009/0272590 | A1 | 11/2009 | Kim et al. | |
| 2013/0288097 | A1 * | 10/2013 | Kawatani | B60L 50/64 |
| | | | | 429/100 |
| 2021/0389053 | A1 | 12/2021 | Lo et al. | |

FOREIGN PATENT DOCUMENTS

| | | |
|---|---|---|
| JP | 2009-270707 A | 11/2009 |
| JP | 3187110 U | 11/2013 |
| JP | 2021-196058 A | 12/2021 |

* cited by examiner

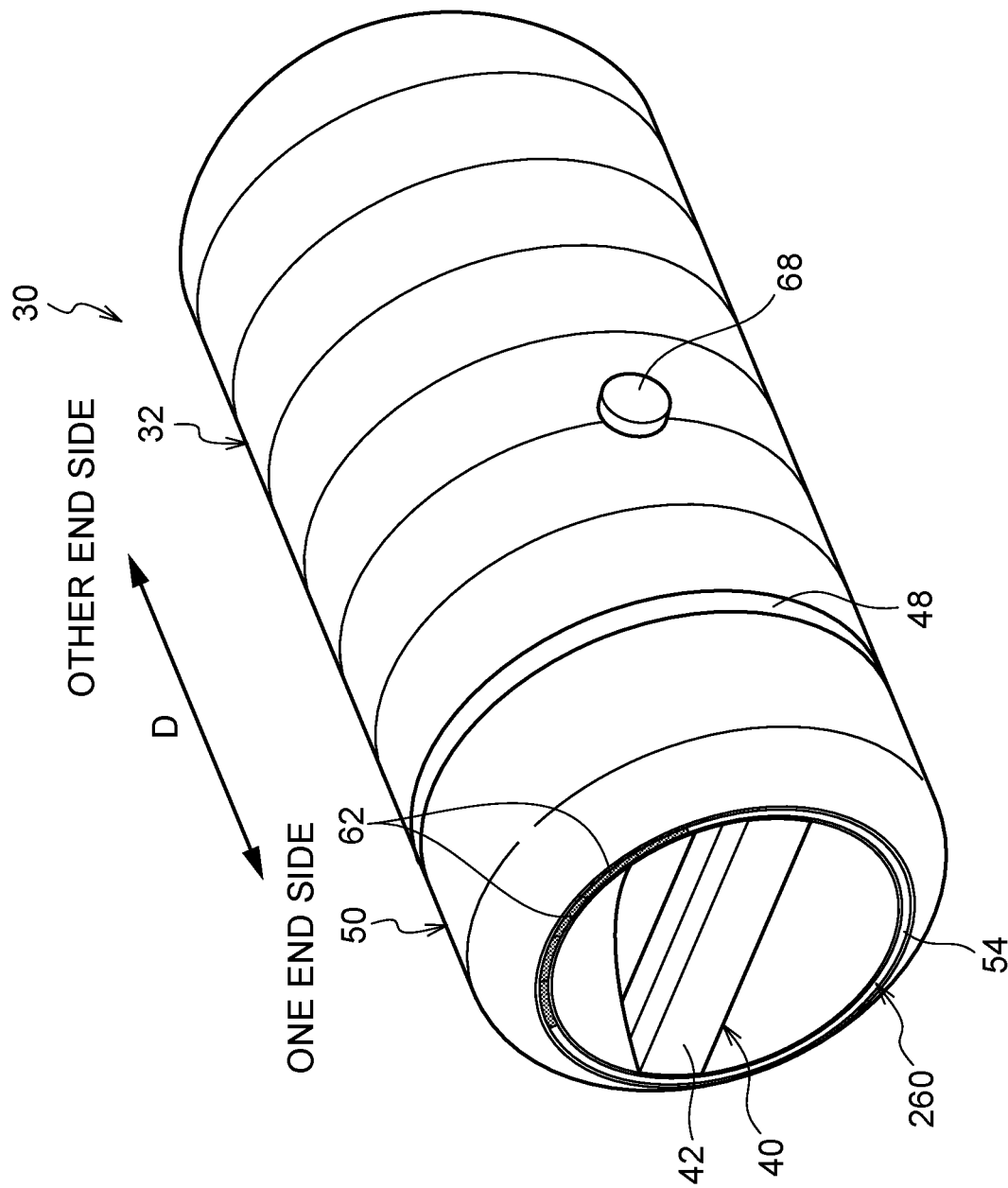

FUEL TANK

CROSS-REFERENCE TO RELATED APPLICATION

This application is based on and claims priority under 35 USC 119 from Japanese Patent Application No. 2021-166471 filed on Oct. 8, 2021, the disclosure of which is incorporated by reference herein.

BACKGROUND

Technical Field

The present disclosure relates to a fuel tank.

Related Art

There is known technology relating to providing a fuel tank so as to be detachably attachable to a fuel-powered device such as a vehicle that uses a fuel such as hydrogen.

For example, Japanese Patent Application Laid-Open (JP-A) No. 2009-270707 discloses technology in which a hydrogen storage case that stores one or more hydrogen tanks and has a handle set at an upper face thereof is provided so as to be detachably attachable to a vehicle. JP-A No. 2009-270707 also discloses technology in which the hydrogen tanks stored in the hydrogen storage case and a fuel cell system are coupled together by fitting one joint of a quick connector installed to a lower portion of the hydrogen storage case storing the hydrogen tanks to another joint of a quick connector installed in a rear underfloor of the vehicle.

In this configuration, it is sufficient to operate just the quick connectors, and so the hydrogen storage case that stores the hydrogen tanks is easy to attach and detach.

However, in the technology disclosed in JP-A No. 2009-270707, an operation is required to install the hydrogen storage case storing the hydrogen tanks to an upper portion of the rear underfloor of the vehicle through a trunk room, and another operation is required to connect the quick connectors. It is therefore desirable to install a hydrogen tank to a hydrogen-powered device in a state enabling hydrogen usage, and to remove the hydrogen tank from the hydrogen-powered device, by simple operations.

SUMMARY

The present disclosure obtains a fuel tank that enables the fuel tank to be installed to a fuel-powered device in a state enabling fuel usage, and the fuel tank to be removed from the fuel-powered device, by simple operations.

A fuel tank of a first aspect includes a circular column-shaped fuel tank body provided so as to be detachably attachable to a fuel-powered device, a handle formed on one end side in a length direction of the fuel tank body, and a first connector formed on another end side in the length direction of the fuel tank body. The first connector is configured such that, by installing the fuel tank body to the fuel-powered device, the first connector is connected to a second connector provided at the fuel-powered device so as to enable fuel to be supplied to the fuel-powered device.

In the first aspect, since the handle is included on the one length direction end side of the fuel tank body, the handle is gripped to lift the fuel tank up and install the fuel tank to the fuel-powered device. Moreover, since the first connector is included on the other length direction end side of the fuel tank body, the first connector of the fuel tank body is connected to the second connector provided at the fuel-powered device by installing the fuel tank body to the fuel-powered device.

By gripping the handle and pulling the fuel tank outward, the first connector of the fuel tank is separated from the second connector of the fuel-powered device, and the fuel tank is removed from the fuel-powered device. This enables the fuel tank to be installed to the fuel-powered device in a state enabling fuel usage, and the fuel tank to be removed from the fuel-powered device, by simple operations.

A fuel tank of a second aspect is the fuel tank of the first aspect, wherein an end face on the other length direction end side of the fuel tank body is formed in a flat shape.

In the second aspect, since the end face on the other length direction end side of the fuel tank body is formed in a flat shape, the fuel tank is capable of standing independently on a flat location. This enables the fuel tank to be placed on a flat location.

A fuel tank of a third aspect is the fuel tank of the first aspect or the second aspect, wherein a recess indented in the length direction of the fuel tank body is formed in an end face on the other length direction end side of the fuel tank body. The first connector is provided in the recess so as not to project out from the end face on the other length direction end side of the fuel tank body.

In the third aspect, since the first connector is provided in the recess so as not to project out from the end face on the other length direction end side of the fuel tank body, the first connector does not touch the ground surface when the fuel tank is placed on a flat location with the end face as its bottom face. This enables the first connector to be prevented from being damaged when the fuel tank is placed on a flat location.

A fuel tank of a fourth aspect is the fuel tank of any one of the first aspect to the third aspect, wherein the first connector includes a supply port through which fuel is supplied to the fuel-powered device, and a filler port through which fuel is filled into the fuel tank body.

In the fourth aspect, since the first connector includes the fuel supply port and filler port, the fuel supply port and filler port are not exposed to the exterior when the fuel tank has been installed to the fuel-powered device. This enables the fuel supply port and filler port to be protected in the state in which the fuel tank has been installed to the fuel-powered device.

A fuel tank of a fifth aspect is the fuel tank of any one of the first aspect to the fourth aspect, further including a remaining fuel level display section configured to display a remaining level of a fuel in the fuel tank body.

In the fifth aspect, since the fuel tank includes the remaining fuel level display section, the remaining level of fuel inside the fuel tank is displayed on the remaining fuel level display section. This enables the remaining level of fuel inside the fuel tank to be ascertained without having to measure the weight of the fuel tank.

A fuel tank of a sixth aspect is the fuel tank of the fifth aspect, wherein the remaining fuel level display section is provided at a position visible from outside the fuel-powered device in a state in which the fuel tank body has been installed to the fuel-powered device.

In the sixth aspect, since the remaining fuel level display section is visible from the outside the fuel-powered device in the state in which the fuel tank has been installed to the fuel-powered device, the remaining level of fuel inside the fuel tank can be ascertained in the state in which the fuel tank has been installed to the fuel-powered device.

The fuel tank of the present disclosure enables the fuel tank to be installed to the fuel-powered device in a state enabling fuel usage, and the fuel tank to be removed from the fuel-powered device, by simple operations.

BRIEF DESCRIPTION OF THE DRAWINGS

Exemplary embodiments of the present disclosure will be described in detail based on the following figures, wherein:

FIG. 13 is a perspective view illustrating a hydrogen tank according to a fourth exemplary embodiment.

DETAILED DESCRIPTION

First Exemplary Embodiment

Explanation follows regarding a hydrogen tank serving as a fuel tank according to a first exemplary embodiment, with reference to the drawings. Note that in FIG. 1, the arrow FR indicates a vehicle front side, the arrow LH indicates a vehicle left side, and the arrow UP indicates a vehicle upper side. Moreover, the arrow in FIG. 3 indicates a length direction D of a hydrogen tank body 32. An example is described in which the hydrogen tank according to the first exemplary embodiment is mounted to a small mobility vehicle (hereafter referred to as a vehicle) that is driven autonomously by electrical energy generated by a chemical reaction between hydrogen and oxygen.

Configuration of Hydrogen Tank-Mounted Vehicle

Figure 1:
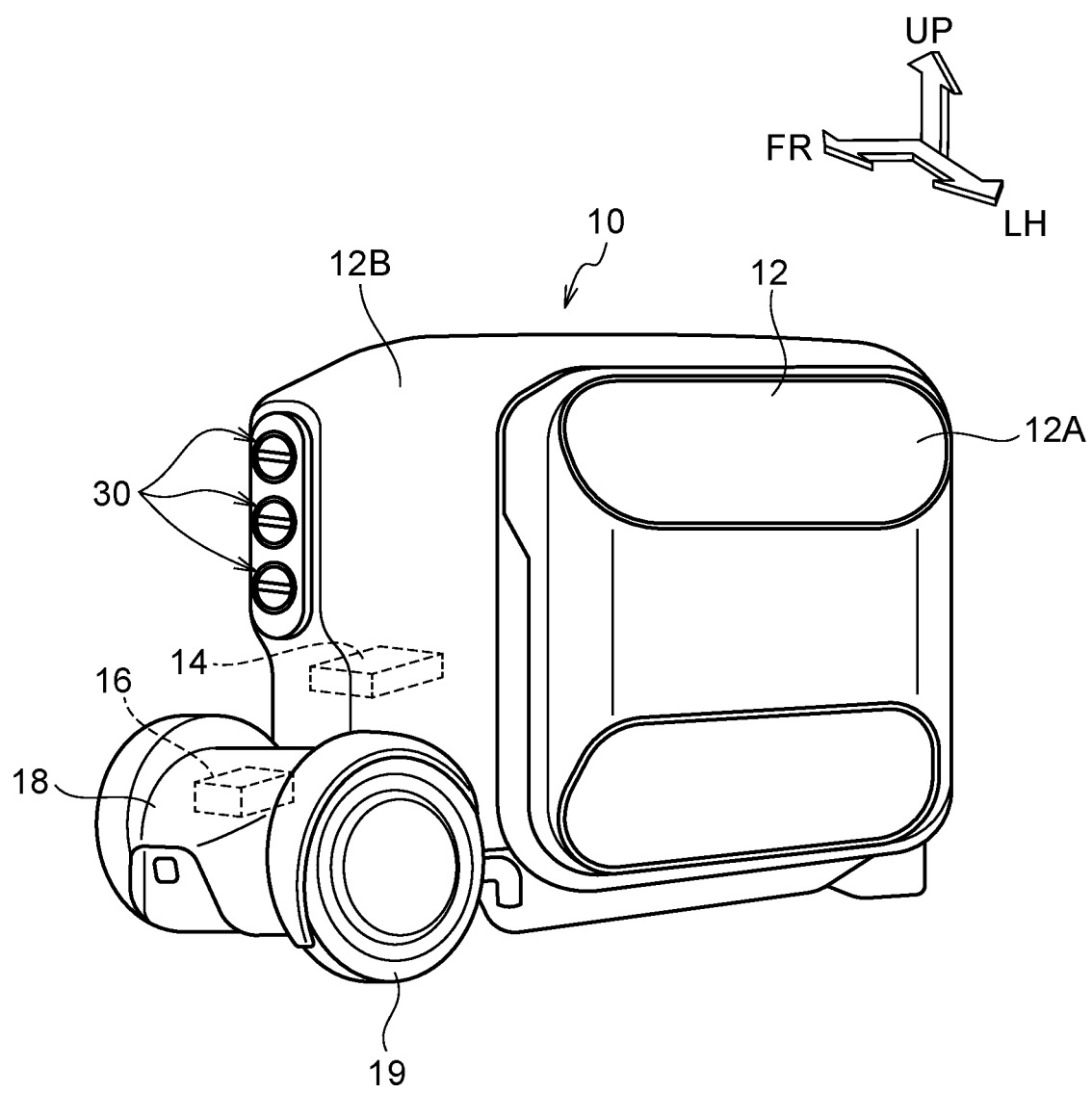
FIG. 1 is a perspective view illustrating a vehicle mounted with hydrogen tanks according to a first exemplary embodiment.

As illustrated in FIG. 1, a vehicle 10 serving as a fuel-powered device includes a body 12, and a drive section 18 including wheels 19.

The body 12 is configured by a rectangular-bodied body section 12A, and a projection section 12B that projects toward the vehicle front side in an elliptical cone shape from the vehicle front side of the body section 12A. Plural (three in the first exemplary embodiment) hydrogen tanks 30 are installed at the vehicle front side of the projection section 12B. Each of the hydrogen tanks 30 is installed horizontally so as to be orientated with its length direction D along a vehicle front-rear direction. The three hydrogen tanks 30 are arranged in a row along a vehicle vertical direction.

A fuel cell (FC) stack 14 is provided to the body 12. The FC stack 14 is connected to the hydrogen tanks 30 and an air compressor (not illustrated in the drawings). The FC stack 14 generates electricity through an electrochemical reaction between hydrogen supplied from the hydrogen tanks 30 and oxygen in compressed air supplied from the air compressor.

The drive section 18 is provided at the vehicle lower side of the vehicle front side of the body 12. A drive motor 16 and the wheels 19 are provided to the drive section 18. The drive motor 16 is connected to the FC stack 14. Two of the wheels 19 are provided spaced apart from one another in a vehicle width direction.

Electric power generated by hydrogen and oxygen being supplied to the FC stack 14 is supplied to the drive motor 16 from the FC stack 14 so as to drive the drive motor 16, and drive force of the drive motor 16 is transmitted to the wheels 19.

Configuration of Hydrogen Tank

Figure 2:
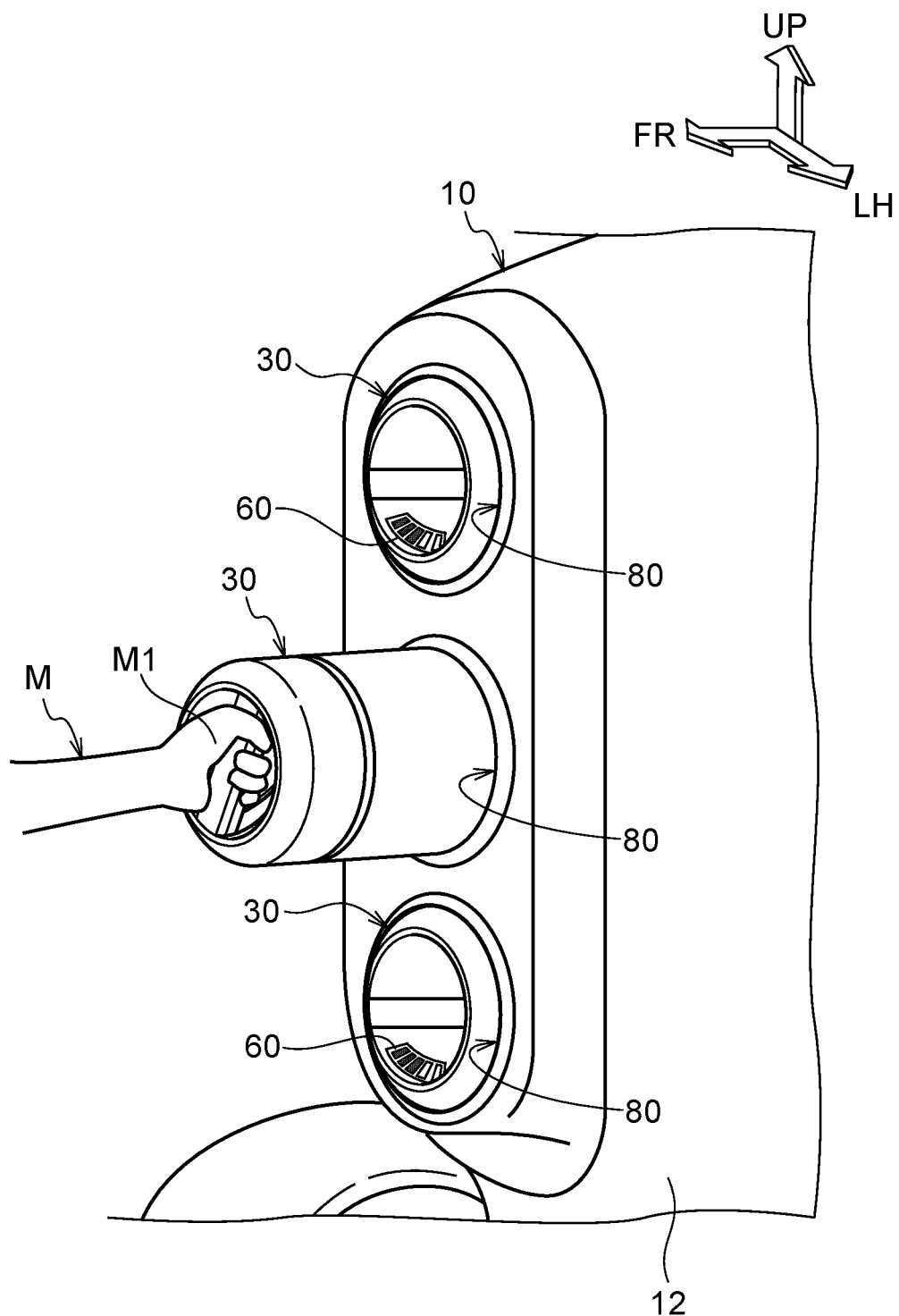
FIG. 2 is an enlarged perspective view illustrating sections where hydrogen tanks according to the first exemplary embodiment are attached to a vehicle.

As illustrated in FIG. 2, the hydrogen tanks 30 are provided so as to be detachably attachable to hydrogen tank installation sections 80 provided at the vehicle front side.

Figure 3:
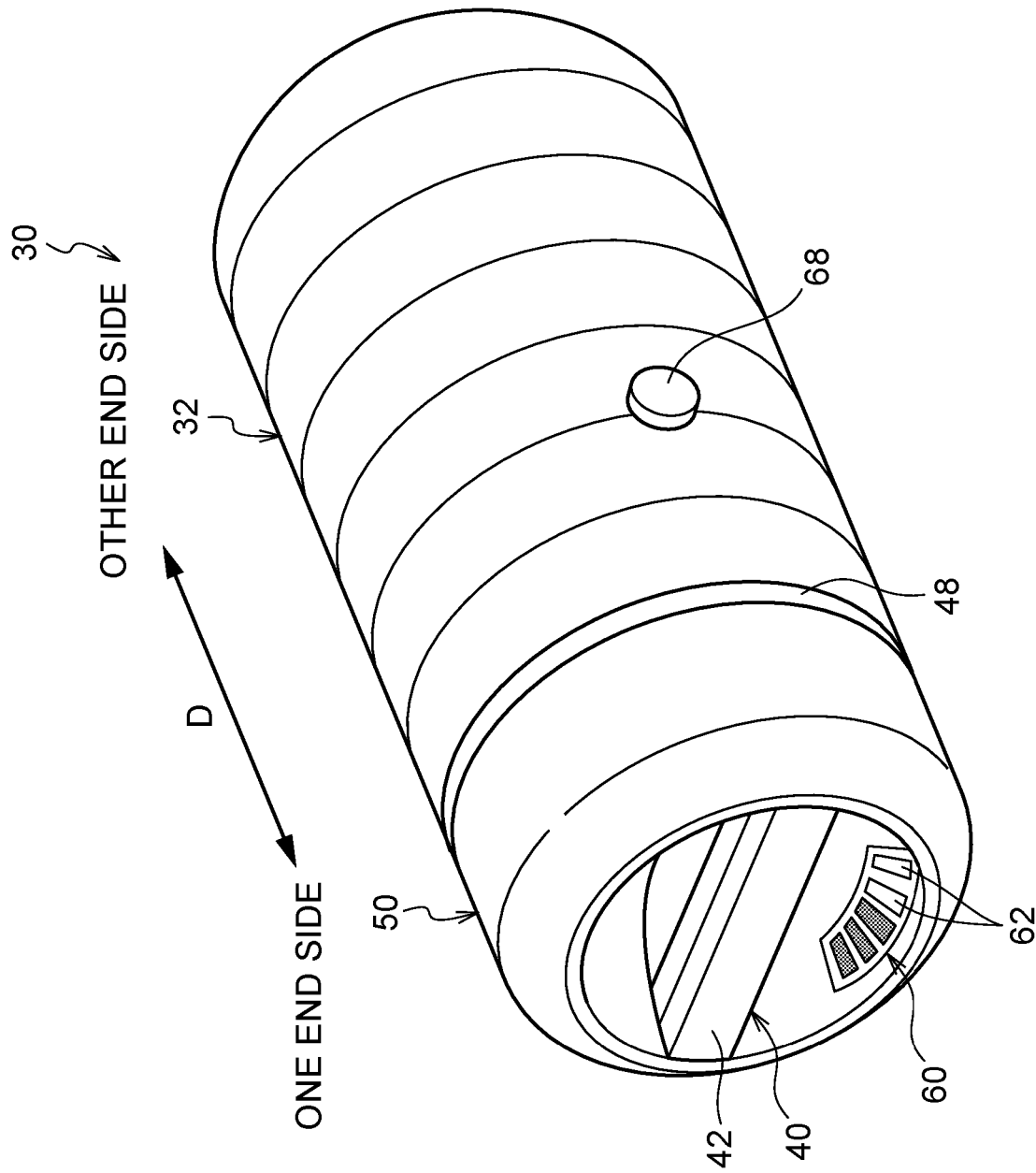
FIG. 3 is a perspective view illustrating a hydrogen tank according to the first exemplary embodiment as viewed diagonally from above.
Figure 4:
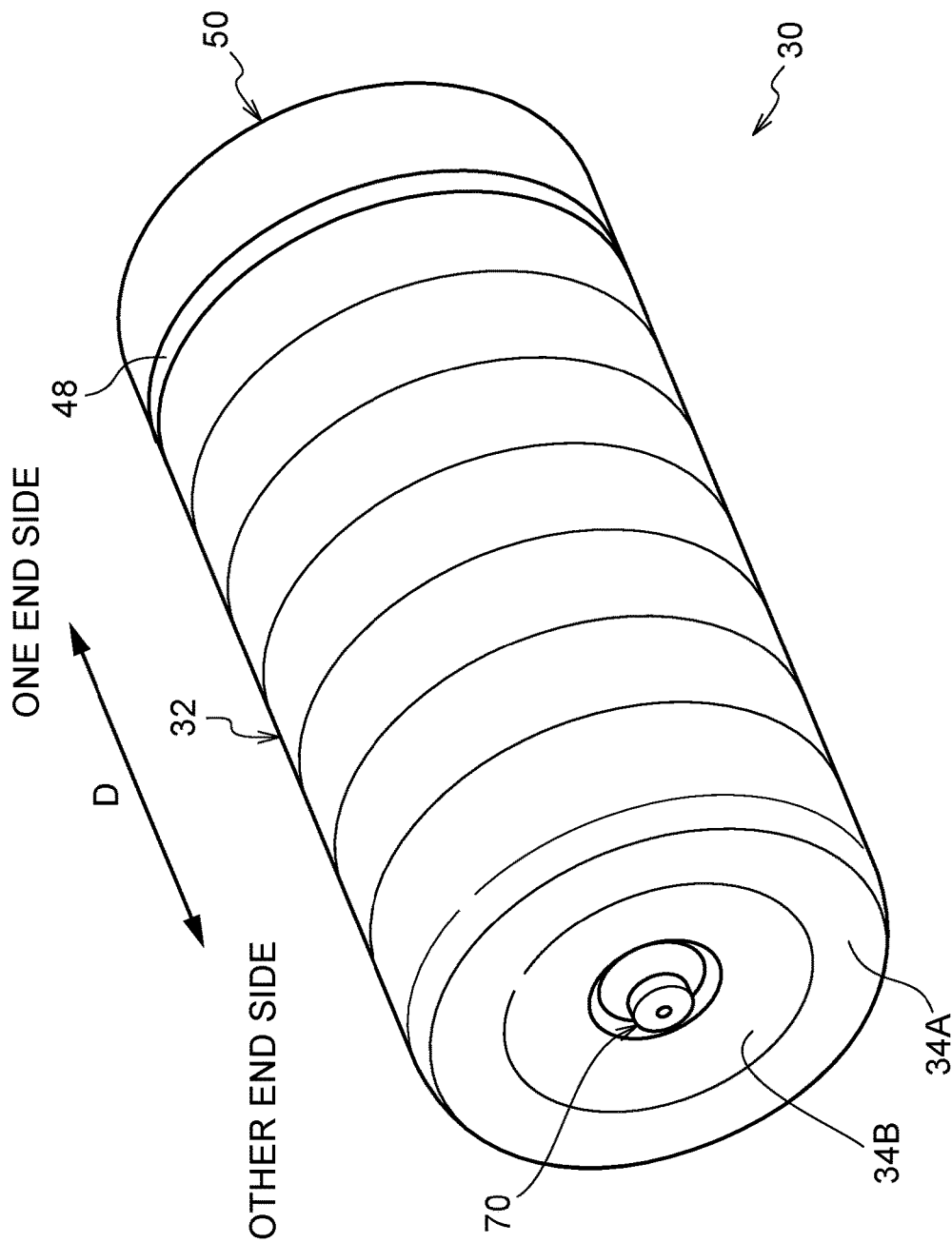
FIG. 4 is a perspective view illustrating a hydrogen tank according to the first exemplary embodiment as viewed diagonally from below.

As illustrated in FIG. 3 and FIG. 4, each of the hydrogen tanks 30 includes the hydrogen tank body 32, serving as a fuel tank body including a handle 40 and a first connector 70, and a cover member 50.

Hydrogen Tank Body

Figure 5:
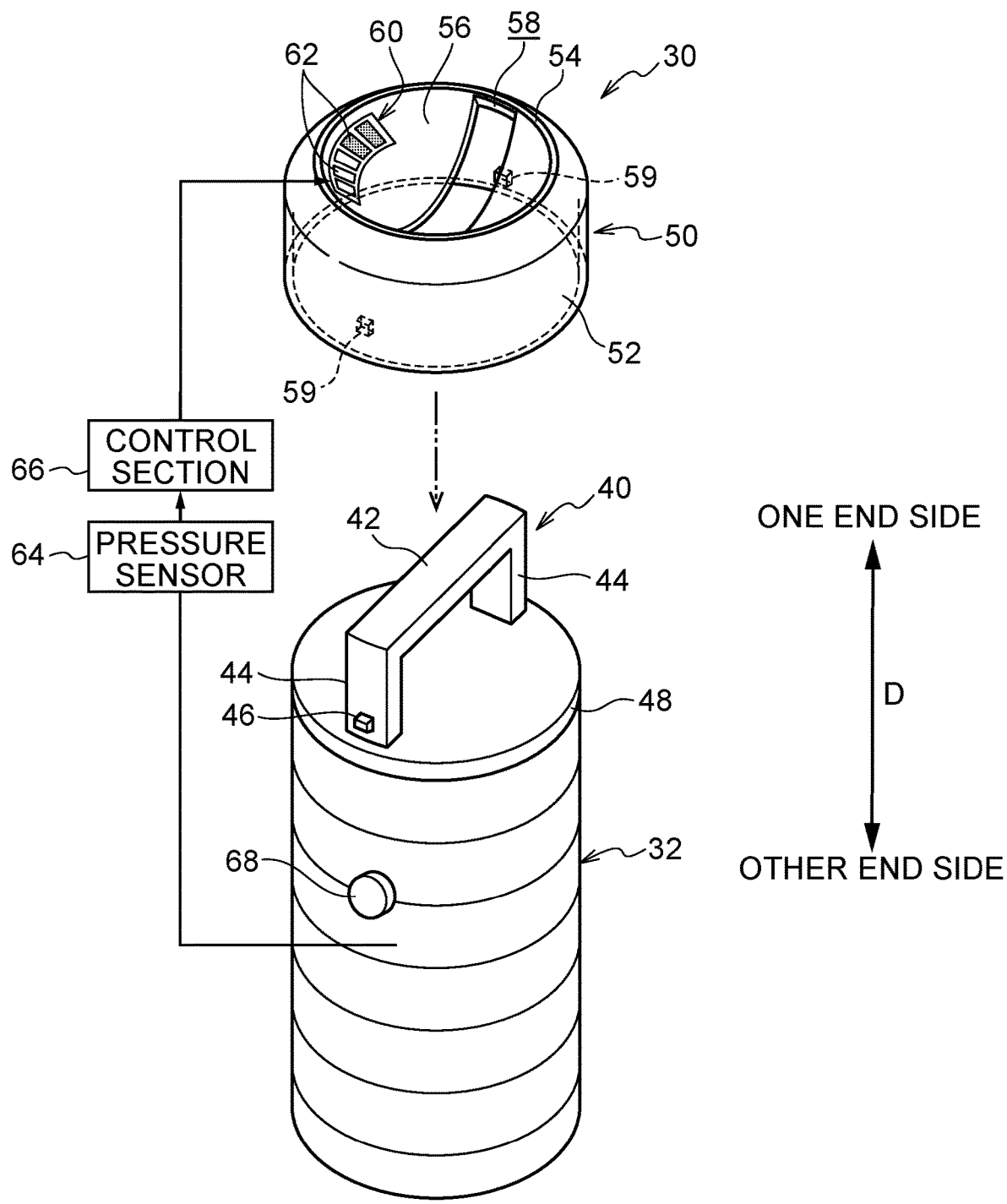
FIG. 5 is an exploded perspective view illustrating a hydrogen tank according to the first exemplary embodiment as viewed diagonally from above.
Figure 6:
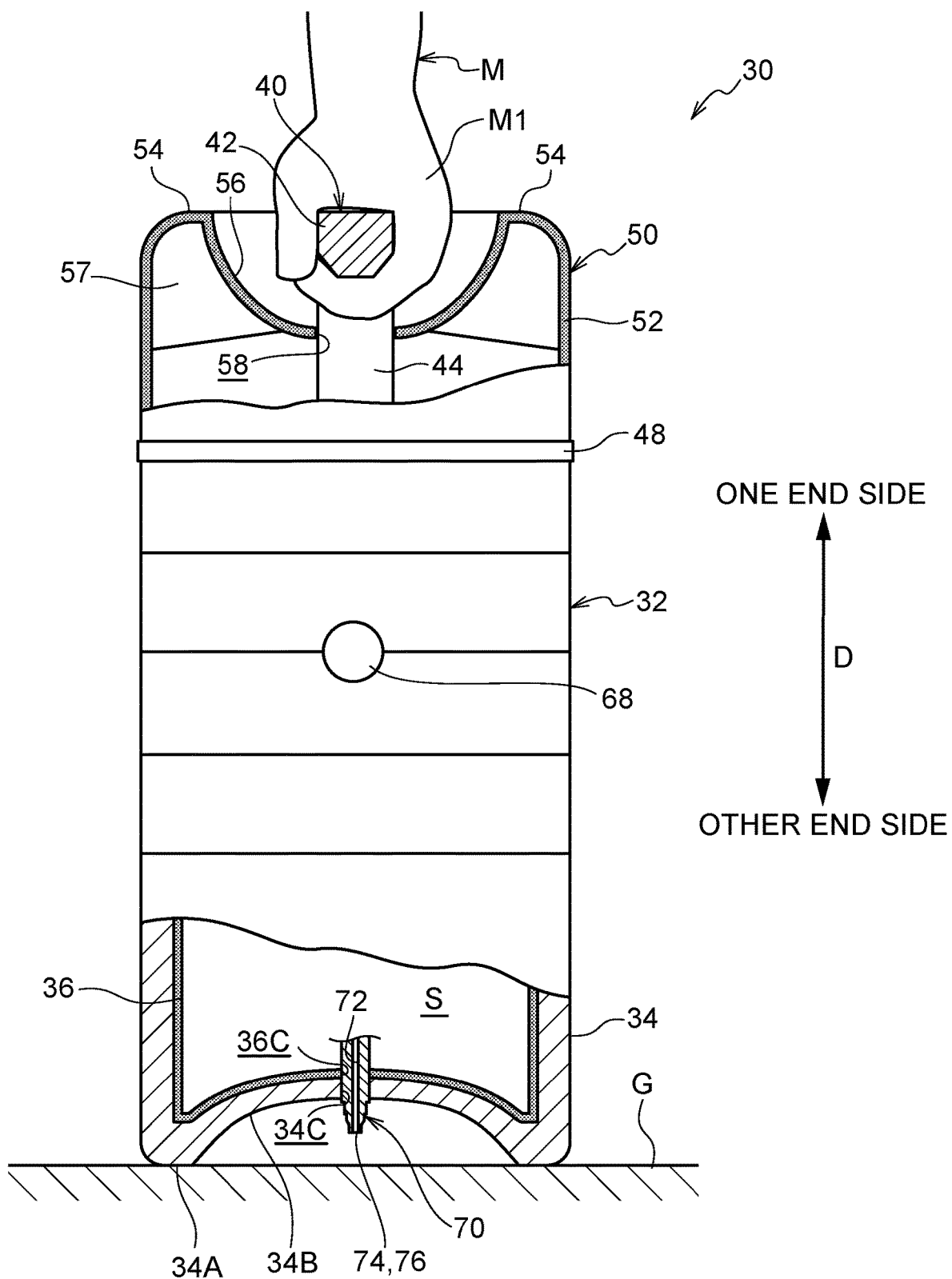
FIG. 6 is a side view illustrating a hydrogen tank according to the first exemplary embodiment with part of the hydrogen tank illustrated in cross-section.

As illustrated in FIG. 5 and FIG. 6, the hydrogen tank body 32 is formed in a substantially circular column shape. The handle 40 is formed on one end side in the length direction D of the hydrogen tank body 32. The first connector 70 is attached to another end side in the length direction D of the hydrogen tank body 32.

As illustrated in FIG. 6, the hydrogen tank body 32 is configured including a lining 36 and a reinforcing section 34 that covers the lining 36 from an outer side. The lining 36 may be formed of a resin material with low hydrogen permeability, such as nylon. A space surrounded by the lining 36 configures a hydrogen storage space S in which the hydrogen is stored in the hydrogen tank 30. The reinforcing section 34 may be formed of a fiber-reinforced resin.

An end face (bottom face) 34A on the other length direction D end side of the hydrogen tank body 32 is formed with a ring-shaped flat face. A recess 34B indented in the length direction D of the hydrogen tank body 32 is formed in the end face 34A. The recess 34B may be formed in a circular bowl shape indented in the length direction D from the end face 34A on the other length direction D end side of the hydrogen tank body 32.

First Connector

As illustrated in FIG. 6, the first connector 70 is provided at a radial direction center of the hydrogen tank body 32. The first connector 70 is provided in the recess 34B so as not to project out toward the other length direction D end side (lower side) from the end face 34A on the other length direction D end side of the hydrogen tank body 32. The first connector 70 is provided so as to project toward the other length direction D end side of the hydrogen tank body 32 from the face forming the recess 34B. Note that the first connector 70 may be provided so as to be set further back toward the one length direction D end side of the hydrogen tank body 32 than the face forming the recess 34B.

The first connector 70 is provided inserted through a liner opening 36C provided in the lining 36 and a reinforcing section opening 34C provided in the reinforcing section 34. A flow path 72 in the first connector 70 connects between the hydrogen storage space S and the exterior of the hydrogen tank body 32.

Hydrogen stored in the hydrogen storage space S is supplied to the exterior of the hydrogen tank 30, and hydrogen is filled into the hydrogen storage space S from the exterior, through the flow path 72 provided in the first connector 70. Namely, a leading end of the flow path 72 in the first connector 70 serves as a supply port 74 through which hydrogen is supplied to the vehicle 10, and also serves as a filler port 76 through which hydrogen is filled into the hydrogen tank body 32.

Handle

As illustrated in FIG. 3 and FIG. 5, the handle 40 is formed on the one length direction D end side (upper side) of the hydrogen tank body 32. The handle 40 is integrally formed to the hydrogen tank body 32. In other words, the handle 40 is for example formed of the same material as the hydrogen tank body 32.

The handle 40 is provided so as to project out in the length direction D from one length direction D end face (upper face) of the hydrogen tank body 32. When the hydrogen tank body 32 is viewed along the length direction D, the handle 40 is formed further toward an inner side than an outer circumferential face of the hydrogen tank body 32.

When the hydrogen tank body 32 is viewed along the length direction D, the handle 40 is formed so as to extend along the radial direction of the hydrogen tank body 32 in a long thin shape. Namely, the handle 40 is formed in a bar shape when the hydrogen tank body 32 is viewed along the length direction D. In other words, the handle 40 is formed in a straight shape when the hydrogen tank body 32 is viewed along the length direction D.

As illustrated in FIG. 5 and FIG. 6, in a side-on view of the hydrogen tank 30, the handle 40 is formed in a rectangular arch shape configured by two pillars 44 and a linking portion 42. The pillars 44 are provided so as to extend upward from the one length direction D end face of the hydrogen tank body 32. Each of the pillars 44 is formed with a substantially rectangular shape in cross-section along a horizontal direction. The two pillars 44 are arranged spaced apart from one another in the horizontal direction to a degree enabling an operator M to insert their hand M1 therebetween.

The linking portion 42 is provided so as to span between upper ends of the two pillars 44. The linking portion 42 is formed with a substantially pentagonal shape in cross-section along a perpendicular direction.

A claw portion 46 that enables the cover member 50 to be detachably attached to the hydrogen tank body 32 is provided to each of the pillars 44. The claw portions 46 are formed so as to project out toward the radial direction outside of the hydrogen tank body 32 from outer peripheral faces of the respective pillars 44.

Cover Member

As illustrated in FIG. 5 and FIG. 6, the cover member 50 is provided so as to be detachably attachable to the one length direction D end side of the hydrogen tank body 32. The cover member 50 is for example made of resin, and is configured by a side wall 52, an upper end face 54, and a recess 56.

The side wall 52 is formed in a substantially circular tube shape. An outer diameter of the side wall 52 may be substantially the same as an outer diameter of the hydrogen tank body 32. The upper end face 54 is formed as a ring-shaped flat face at the one length direction D end side (upper end side) of the side wall 52.

The recess 56 is formed in a circular bowl shape indented in the length direction D from the upper end face 54 of the cover member 50. A rectangular opening 58 through which the handle 40 can be inserted is formed in the recess 56. The opening 58 is formed as an opening that is slightly larger than the outer profile of the handle 40.

As illustrated in FIG. 5, fitting holes 59 into which the claw portions 46 of the cover member 50 are fitted are formed in the side wall 52. The cover member 50 is attached to the hydrogen tank body 32 by inserting the handle 40 of the hydrogen tank body 32 through the opening 58 in the cover member 50 and fitting the claw portions 46 of the handle 40 into the fitting holes 59 in the cover member 50. The cover member 50 is removed from the hydrogen tank body 32 by releasing the claw portions 46 from being fitted into the fitting holes 59.

When viewed along the length direction D, the recess 56 is located in a space formed between an outside face of the handle 40 and the outer circumferential face of the hydrogen tank body 32. In other words, the recess 56 is provided in a space that has been formed by forming the handle 40 to the hydrogen tank body 32.

As illustrated in FIG. 6, in a state in which the cover member 50 has been attached to the hydrogen tank body 32, the handle 40 is disposed inside the recess 56. In other words, the handle 40 is disposed at a center side of the recess 56. In the state in which the cover member 50 has been attached to the hydrogen tank body 32, the linking portion 42 of the handle 40 and the recess 56 are provided spaced apart from one another to a degree enabling the operator M to insert their hand M1 therebetween. The handle 40 is provided so as not to project out from the upper end face 54 of the cover member 50 in the state in which the cover member 50 has been attached to the hydrogen tank body 32.

The cover member 50 may be provided with a reinforcing rib 57 connecting between the side wall 52, the upper end face 54, and the recess 56.

Remaining Hydrogen Level Display Section

As illustrated in FIG. 5, a remaining hydrogen level display section 60, serving as a remaining fuel level display section that displays the remaining level of hydrogen stored in the hydrogen storage space S of the hydrogen tank body 32, is provided in the recess 56. The remaining hydrogen level display section 60 is provided at a position visible from outside the vehicle 10 in a state in which the hydrogen tank body 32 has been installed to the vehicle 10.

In the hydrogen tank 30, detection information from a pressure sensor 64 that detects pressure in the hydrogen storage space S of the hydrogen tank body 32 is input to a control section 66. The remaining hydrogen level is computed by the control section 66, and this remaining hydrogen level is displayed on the remaining hydrogen level display section 60.

The remaining hydrogen level display section 60 may be configured by a liquid crystal display that displays the remaining level of hydrogen by displaying plural segments 62 of a bar scale. Note that electric power required by the remaining hydrogen level display section 60 may be supplied from the FC stack 14.

Gauge

As illustrated in FIG. 5 and FIG. 6, a ring-shaped gauge 48 is provided at an outer edge on the one length direction end side of the hydrogen tank body 32. The gauge 48 is formed in a different color and of a different material than the outer circumferential face of the hydrogen tank body 32, and can serve as a marker for checking that the hydrogen tank 30 is correctly installed to the hydrogen tank installation section 80 when the hydrogen tank 30 is being installed to one of the hydrogen tank installation sections 80 of the vehicle 10. Note that plural gauges 48 may be provided on the outer circumferential face of the hydrogen tank body 32 so as to be spaced apart at uniform intervals along the length direction D.

Lock Section

A lock section 68 is provided to a length direction D central portion of the outer circumferential face of the hydrogen tank body 32. When the hydrogen tank body 32 is viewed along the length direction D, the lock section 68 may be formed in the vicinity of an intersection between an extension direction of the linking portion 42 of the handle 40 and the outer circumferential face of the hydrogen tank body 32. In other words, the lock section 68 may be formed at substantially the same position about the circumferential direction of the hydrogen tank body 32 as both end portions of the linking portion 42.

The lock section 68 is formed projecting in a circular column shape toward the radial direction outside of the hydrogen tank body 32 from the outer circumferential face of the hydrogen tank body 32. The lock section 68 configures a lock mechanism, described later, by which the hydrogen tank 30 is locked to and cannot be removed from the vehicle 10 when the hydrogen tank 30 has been installed to one of the hydrogen tank installation sections 80 of the vehicle 10.

Configuration of Vehicle Hydrogen Tank Installation Sections

Figure 7:
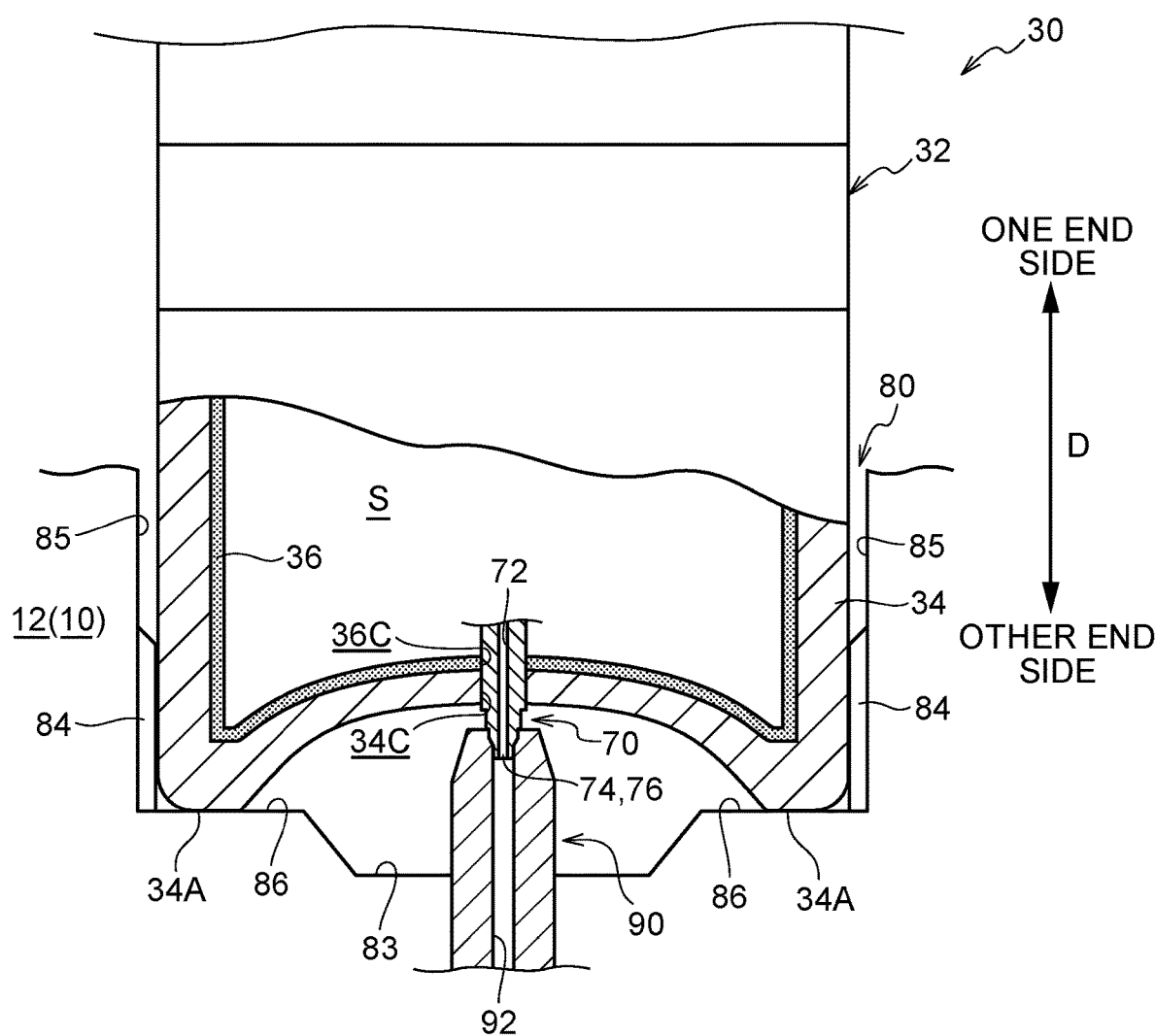
FIG. 7 is an enlarged side view illustrating a hydrogen tank according to the first exemplary embodiment in a state installed to a vehicle with part of the hydrogen tank illustrated in cross-section.
Figure 8:
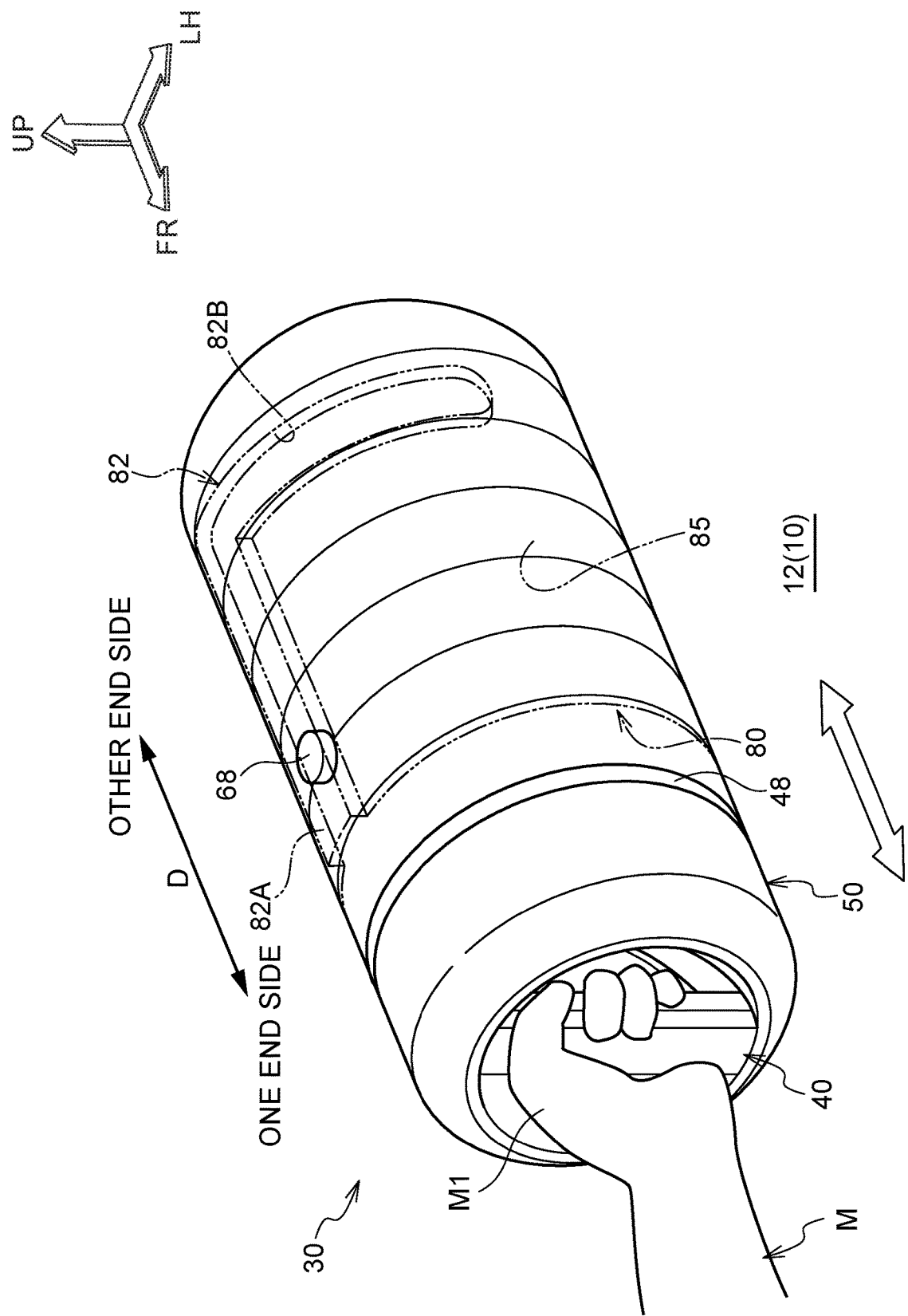
FIG. 8 is a perspective view illustrating a state in which a hydrogen tank according to the first exemplary embodiment is in the process of being installed to a vehicle.

As illustrated in FIG. 7 and FIG. 8, each of the hydrogen tank installation sections 80 of the vehicle 10 is formed as a circular column-shaped cavity that is capable of housing the hydrogen tank 30.

As illustrated in FIG. 7, a bottom face 83, a step portion 86, and a rib 84 are formed in a bottom portion of the hydrogen tank installation section 80.

The bottom face 83 is formed in a circular shape that is smaller than the outer diameter of the hydrogen tank body 32. A second connector 90 that projects upward from the bottom face 83 is disposed at a radial direction center of the bottom face 83.

The step portion 86 is formed as a step in a depth direction of the hydrogen tank installation section 80 with respect to the bottom face 83. The step portion 86 may be formed in a ring shape so as to surround the circumference of the bottom face 83.

The rib 84 is formed so as to connect between a side wall 85 and the step portion 86 of the hydrogen tank installation section 80. The rib 84 functions as a restricting rib that restricts movement of the hydrogen tank body 32 in a direction perpendicular to the length direction D when the hydrogen tank 30 has been inserted into the hydrogen tank installation section 80.

By installing the hydrogen tank 30 to the hydrogen tank installation section 80, the first connector 70 is connected to the second connector 90, and hydrogen in the hydrogen storage space S is supplied to the vehicle 10 through the flow path 72 in the first connector 70 and a flow path 92 in the second connector 90.

Lock Mechanism

As illustrated in FIG. 8, a guide section 82 is formed in the side wall 85 of the hydrogen tank installation section 80. The guide section 82 is formed with a size enabling the lock section 68 of the hydrogen tank 30 to be inserted therein. The guide section 82 is configured of a first guide portion 82A extending along the depth direction from an opening edge of the hydrogen tank installation section 80, and a second guide portion 82B extending about a circumferential direction of the side wall 85 from a bottom portion of the first guide portion 82A.

As illustrated in FIG. 7 and FIG. 8, the lock section 68 is formed so as to abut an end portion of the first guide portion 82A in the hydrogen tank installation section 80-depth direction when the hydrogen tank 30 has been inserted into the hydrogen tank installation section 80 such that the end face 34A on the other length direction D end side of the hydrogen tank body 32 abuts the step portion 86.

When viewed along the depth direction of the hydrogen tank installation section 80, a length of the second guide portion 82B about the side wall 85-circumferential direction is a length spanning from the first guide portion 82A to an angle of 90°. In other words, the length of the second guide portion 82B about the side wall 85-circumferential direction is one quarter of the entire circumferential direction length of the hydrogen tank installation section 80.

Attachment and Detachment Operations of Hydrogen Tank to and from Vehicle Installation Operation As illustrated in FIG. 6, the hydrogen tank body 32 is placed on the ground G with the end face (bottom face) 34A on the other length direction D end side of the hydrogen tank body 32 as a bottom face.

The operator M grips the handle 40 of the hydrogen tank 30 with their hand M1, lifts the hydrogen tank 30, and inserts the hydrogen tank 30 into one of the hydrogen tank installation sections 80 of the vehicle 10 as illustrated in FIG. 8.

When this is performed, the lock section 68 of the hydrogen tank 30 is inserted into the first guide portion 82A of the hydrogen tank installation section 80 of the vehicle 10 with the handle 40 orientated along the perpendicular direction. The lock section 68 is thereby guided by the first guide portion 82A, and the hydrogen tank 30 is deeply inserted into the hydrogen tank installation section 80.

Next, the end face 34A on the other length direction D end side of the hydrogen tank body 32 abuts the step portion 86 of the hydrogen tank installation section 80. When this occurs, the first connector 70 provided at the hydrogen tank 30 is connected to the second connector 90 provided at the hydrogen tank installation section 80 of the vehicle 10 as illustrated in FIG. 7.

Figure 9:
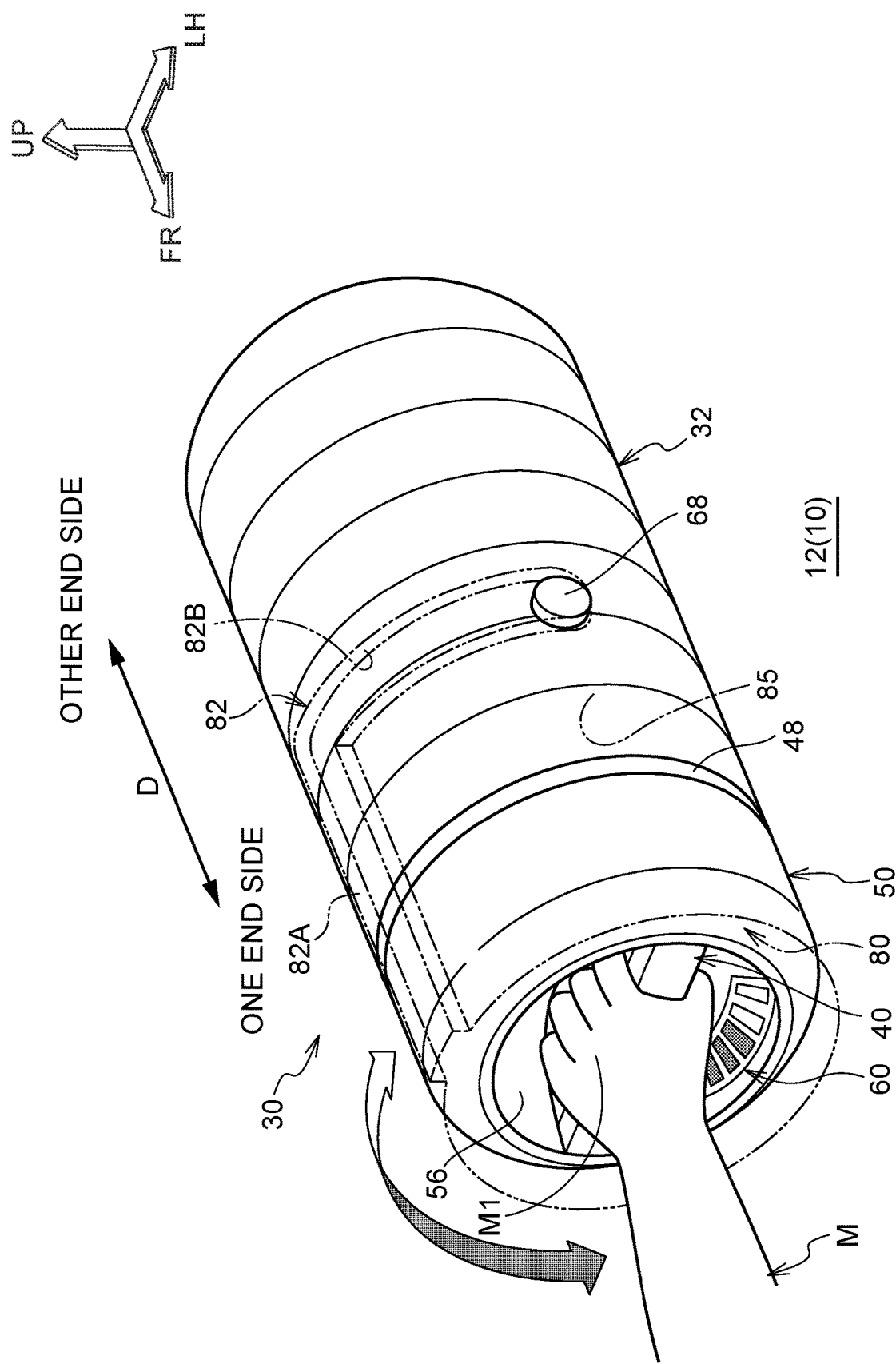
FIG. 9 is a perspective view illustrating a locked state of a hydrogen tank according to the first exemplary embodiment.

Next, as illustrated in FIG. 9, the operator M rotates the hydrogen tank 30 90° toward one circumferential direction side of the hydrogen tank body 32 while gripping the handle 40. When this is performed, the lock section 68 is rotated 90° toward the one circumferential direction side of the hydrogen tank body 32 guided by the second guide portion 82B. The hydrogen tank 30 is thereby placed in a locked state in which it cannot be removed from the vehicle 10.

Removal Operation

As illustrated in FIG. 9, the operator M rotates the hydrogen tank 30 90° toward another circumferential direction side of the hydrogen tank body 32 while gripping the handle 40. When this is performed, the lock section 68 is rotated 90° toward the other circumferential direction side of the hydrogen tank body 32 guided by the second guide portion 82B. The hydrogen tank 30 is thereby placed in a lock-released state in which it can be removed from the vehicle 10. Namely, the hydrogen tank 30 is placed in the lock-released state in which the locked state has been released. The lock section 68 of the hydrogen tank 30 and the guide section 82 of the hydrogen tank installation section 80 configure a lock mechanism.

Next, as illustrated in FIG. 8, the operator M grips the handle 40 with their hand M1 and pulls the hydrogen tank 30 toward them to remove the hydrogen tank 30 from the vehicle 10.

Hydrogen Tank Filling Operation

Figure 10:
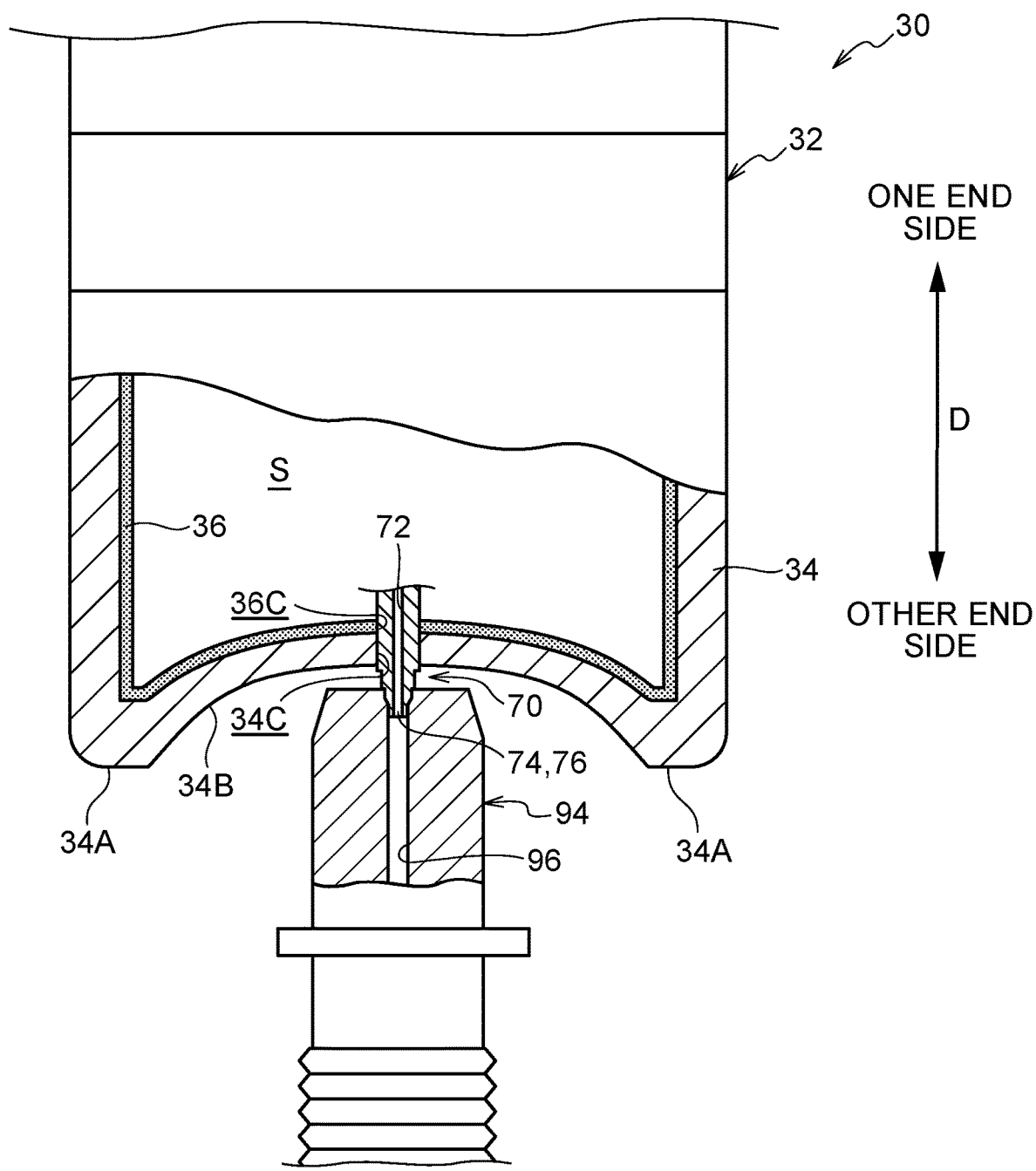
FIG. 10 is an enlarged side view illustrating a hydrogen tank according to the first exemplary embodiment in a state attached to a dispenser nozzle with part of the hydrogen tank illustrated in cross-section.

As illustrated in FIG. 10 as an example, a nozzle 94 of a hydrogen station dispenser is connected to the first connector 70 of the hydrogen tank 30 that has been removed from the vehicle 10. Hydrogen is filled into the hydrogen storage space S through a flow path 96 in the nozzle 94 and the flow path 72 in the first connector 70.

Having been filled with hydrogen, the hydrogen tank 30 is installed to the vehicle 10 by the above-described installation operation of the hydrogen tank 30 to the vehicle 10.

Operation and Effects of Hydrogen Tank

Next, explanation follows regarding operation and effects of the hydrogen tank 30 of the first exemplary embodiment.

The hydrogen tank 30 of the first exemplary embodiment includes the circular column-shaped hydrogen tank body 32 provided so as to be detachably attachable to the vehicle 10, and the handle 40 formed on the one length direction D end side of the hydrogen tank body 32. The hydrogen tank 30 also includes the first connector 70 formed on the other length direction D end side of the hydrogen tank body 32. By installing the hydrogen tank body 32 to the vehicle 10, the first connector 70 is connected to the second connector 90 provided to the vehicle 10 so as to enable hydrogen to be supplied to the vehicle 10.

Since the handle 40 is included on the one length direction D end side of the hydrogen tank body 32, the handle 40 is gripped to lift the hydrogen tank 30 up and install the hydrogen tank 30 to the vehicle 10. Moreover, since the first connector 70 is included on the other length direction D end side of the hydrogen tank body 32, the first connector 70 of the hydrogen tank body 32 is connected to the second connector 90 provided to the vehicle 10 by installing the hydrogen tank body 32 to the vehicle 10. By gripping the handle 40 and pulling the hydrogen tank 30 outward, the first connector 70 of the hydrogen tank 30 is separated from the second connector 90 of the vehicle 10, and the hydrogen tank 30 is removed from the vehicle 10.

This enables the hydrogen tank 30 to be installed to the vehicle 10 in a state enabling hydrogen usage, and the hydrogen tank 30 to be removed from the vehicle 10, by simple operations in which the handle 40 is operated.

In the hydrogen tank 30 of the first exemplary embodiment, the end face 34A on the other length direction D end side of the hydrogen tank body 32 is formed in a flat shape.

Since the end face 34A on the other length direction D end side of the hydrogen tank body 32 is formed in a flat shape, the hydrogen tank 30 is capable of standing independently on the ground G. This enables the hydrogen tank 30 to be placed on the ground G.

In the hydrogen tank 30 of the first exemplary embodiment, the recess 34B that is indented in the length direction D of the hydrogen tank body 32 is formed in the end face 34A on the other length direction D end side of the hydrogen tank body 32, and the first connector 70 is provided in the recess 34B so as not to project out from the end face 34A on the other length direction D end side of the hydrogen tank body 32.

Since the first connector 70 is provided in the recess 34B so as not to project out from the end face 34A on the other length direction D end side of the hydrogen tank body 32, the first connector 70 does not touch the ground G when the hydrogen tank 30 is placed on the ground G with the end face 34A as its bottom face. This enables the first connector 70 to be prevented from being damaged when the hydrogen tank 30 is placed on the ground G.

Moreover, since the first connector 70 does not project out from the end face 34A on the other length direction D end side of the hydrogen tank body 32, hydrogen tanks 30 can be suitably packed when transporting the hydrogen tanks 30. This enables loading efficiency of hydrogen tanks 30 to be improved.

In the hydrogen tank 30 of the first exemplary embodiment, the first connector 70 includes the supply port 74 through which hydrogen is supplied to the vehicle 10 and the filler port 76 through which hydrogen is filled into the hydrogen tank body 32.

Since the first connector 70 includes the supply port 74 and the filler port 76, the supply port 74 and the filler port 76 are not exposed to the exterior in the state in which the hydrogen tank 30 has been installed to the vehicle 10. This enables the hydrogen supply port 74 and filler port 76 to be protected in the state in which the hydrogen tank 30 has been installed to the vehicle 10.

The hydrogen tank 30 of the first exemplary embodiment includes the remaining hydrogen level display section 60 that displays the remaining level of hydrogen in the hydrogen tank body 32.

Since the hydrogen tank 30 includes the remaining hydrogen level display section 60, the remaining level of hydrogen inside the hydrogen tank 30 is displayed on the remaining hydrogen level display section 60. This enables the remaining level of hydrogen inside the hydrogen tank 30 to be ascertained without having to measure the weight of the hydrogen tank 30.

In the hydrogen tank 30 of the first exemplary embodiment, the remaining hydrogen level display section 60 is provided at a position visible from outside the vehicle 10 in the state in which the hydrogen tank body 32 has been installed to the vehicle 10.

Since the remaining hydrogen level display section 60 is visible from outside the vehicle 10 in the state in which the hydrogen tank 30 has been installed to the vehicle 10, the remaining level of hydrogen inside the hydrogen tank 30 can be ascertained in the state in which the hydrogen tank 30 has been installed to the vehicle 10. This enables a hydrogen refill timing for the hydrogen tank 30 to be ascertained while in the state in which the hydrogen tank 30 has been installed to the vehicle 10.

Second Exemplary Embodiment

A hydrogen tank of a second exemplary embodiment differs from the hydrogen tank of the first exemplary embodiment in the respect that is has a differently shaped handle.

Explanation follows regarding configuration of the hydrogen tank of the second exemplary embodiment. Note that sections that are the same or equivalent to content described in the first exemplary embodiment are described using the same terminology and reference numerals.

Figure 11:
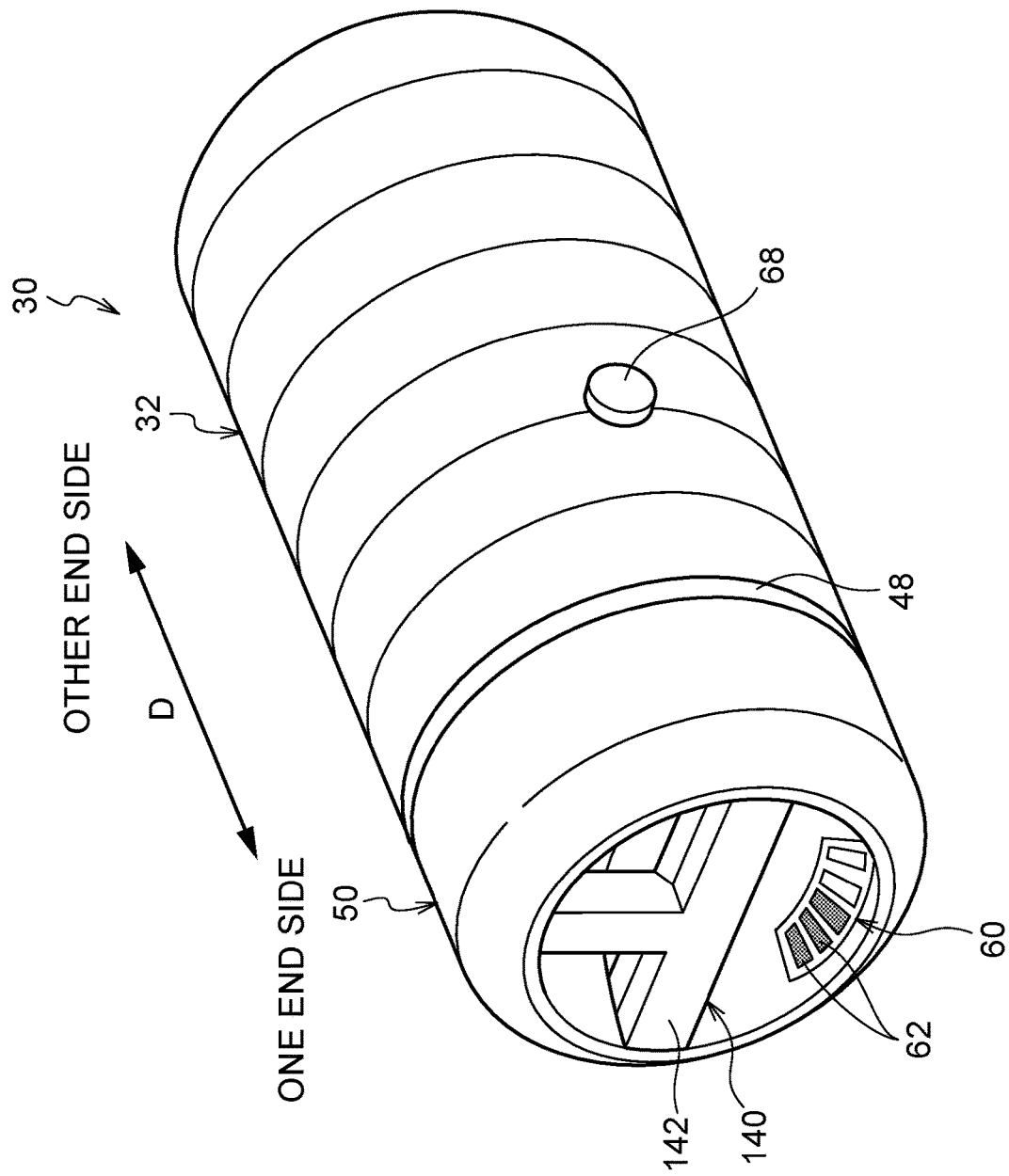
FIG. 11 is a perspective view illustrating a hydrogen tank according to a second exemplary embodiment.

As illustrated in FIG. 11, in the second exemplary embodiment, a handle 140 is formed on the one length direction D end side (upper side) of the hydrogen tank body 32. The handle 140 is integrally formed to the hydrogen tank body 32. The handle 140 is configured by three pillars 44 and a linking portion 142. The linking portion 142 is formed in a T shape when the hydrogen tank body 32 is viewed along the length direction D. The linking portion 142 of the handle 140 is provided spaced apart from the recess 56 to a degree enabling the operator M to insert their hand M1 therebetween in a state in which the cover member 50 has been attached to the hydrogen tank body 32.

Such a configuration enables similar operation and effects to those of the hydrogen tank of the first exemplary embodiment to be exhibited. Moreover, forming the handle 140 in a T shape when the hydrogen tank body 32 is viewed along the length direction D enables the strength of the handle 140 to be reinforced.

Third Exemplary Embodiment

A hydrogen tank of a third exemplary embodiment differs from the hydrogen tanks of the above exemplary embodiments in the respect that its remaining hydrogen level display section is at a different position.

Explanation follows regarding configuration of the hydrogen tank of the third exemplary embodiment. Note that sections that are the same or equivalent to content described in the first exemplary embodiment are described using the same terminology and reference numerals.

Figure 12:
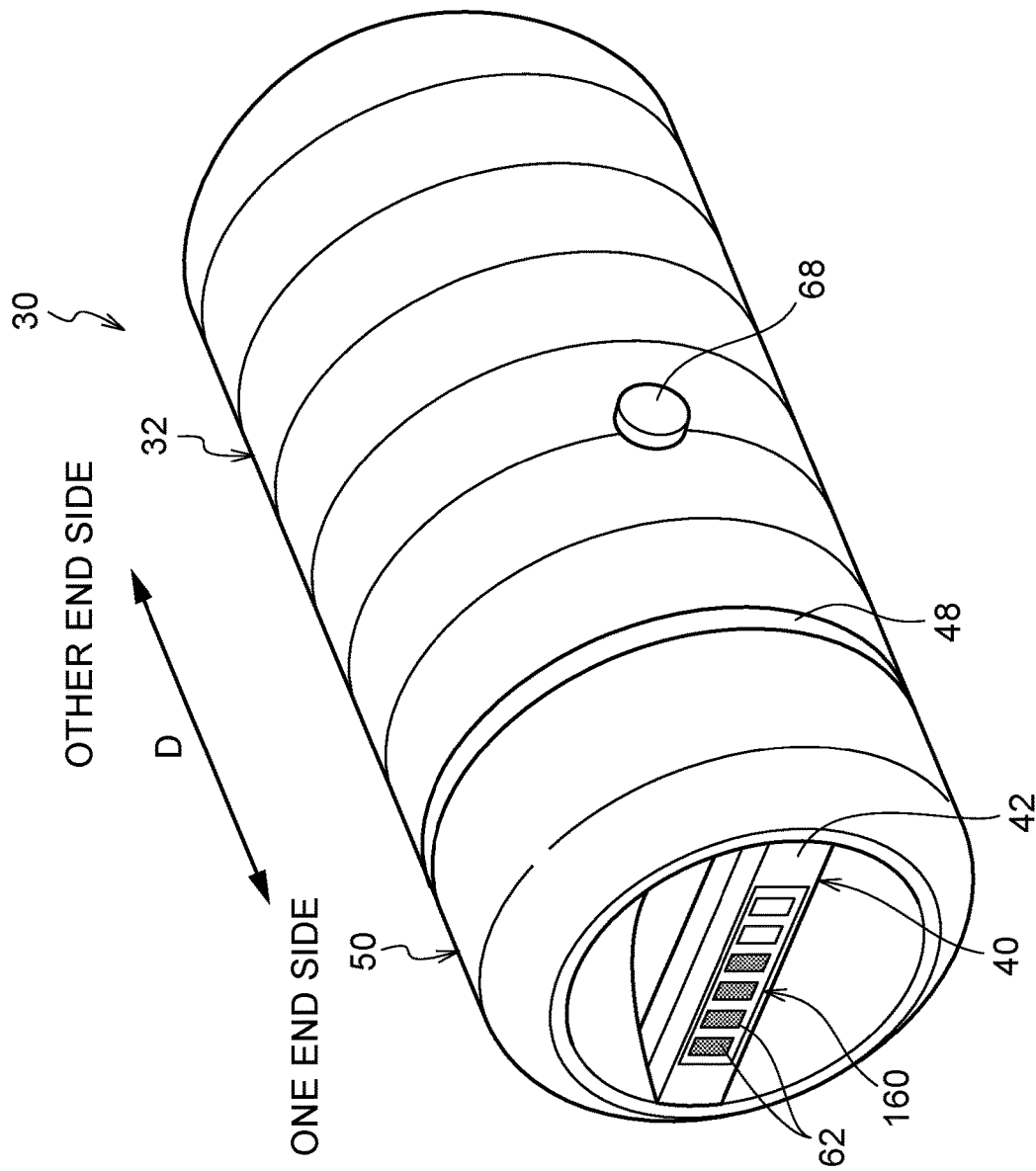
FIG. 12 is a perspective view illustrating a hydrogen tank according to a third exemplary embodiment.

As illustrated in FIG. 12, in the third exemplary embodiment, a remaining hydrogen level display section 160 is attached to one length direction D end face of the linking portion 42 of the handle 40. In other words, the remaining hydrogen level display section 160 is provided to the end face on the one length direction D end side of the handle 40.

Such a configuration also enables similar operation and effects to those of the hydrogen tank of the first exemplary embodiment to be exhibited. Moreover, since the remaining hydrogen level display section 160 is provided to the end face on the one length direction D end side of the handle 40, the remaining hydrogen level display sections 160 of plural hydrogen tanks 30 are orientated along the horizontal direction when the hydrogen tanks 30 have been installed to the vehicle 10 and are in locked states. This makes it easier for the operator M to check the remaining levels of the hydrogen tanks 30 in the state in which the hydrogen tanks 30 have been installed to the vehicle 10.

Fourth Exemplary Embodiment

A hydrogen tank of a fourth exemplary embodiment differs from the hydrogen tanks of the above exemplary embodiments in the respect that its remaining hydrogen level display section is at a different position.

Explanation follows regarding configuration of the hydrogen tank of the fourth exemplary embodiment. Note that sections that are the same or equivalent to content described in the first exemplary embodiment are described using the same terminology and reference numerals.

As illustrated in FIG. 13, in the fourth exemplary embodiment, a remaining hydrogen level display section 260 is attached to the upper end face 54 of the cover member 50.

Such a configuration also enables similar operation and effects to those of the hydrogen tank of the first exemplary embodiment to be exhibited. Moreover, since the remaining hydrogen level display section 260 is provided to the upper end face 54 of the cover member 50, the remaining hydrogen level display section 260 is disposed at the length direction D end face of the cover member 50. This makes it easier for the operator M to check the remaining level of the hydrogen tank 30 in the state in which the hydrogen tank 30 has been installed to the vehicle 10.

Hydrogen tanks of the present disclosure have been described above with reference to the above exemplary embodiments. However, specific configuration is not limited to that described in the above exemplary embodiments, and various design modifications and so on are permitted within a range not departing from the spirit of the present disclosure.

In the above exemplary embodiments, an example has been described in which the recess 56 is provided in the cover member 50 that is detachably attachable to the hydrogen tank body 32. However, a recess may be integrally provided in the hydrogen tank body.

In the above exemplary embodiments, an example has been described in which the recess 56 is formed in a circular bowl shape indented in the length direction D from the upper end face 54 of the cover member 50. However, a recess may be formed in a rectangular box shape indented in the length direction D from the upper end face 54 of the cover member 50.

In the above exemplary embodiments, an example has been described in which the handle 40 is formed in a bar shape or a T shape when the hydrogen tank body 32 is viewed along the length direction D. However, the handle is not limited to such shapes, and may for example be formed in a cross shape or a circular shape when the hydrogen tank body 32 is viewed along the length direction D.

In the above exemplary embodiments, an example has been described in which the lock mechanism is configured by the lock section 68 provided at the hydrogen tank body 32 and the guide section 82 provided at the hydrogen tank installation section 80. However, the lock mechanism is not limited to such a configuration, as long as it is a configuration that enables switching between the locked state in which the hydrogen tank body 32 cannot be removed from the vehicle 10 and the lock-released state in which the locked state has been released by the hydrogen tank body 32 being rotated in the circumferential direction.

In the above exemplary embodiments, an example has been described in which the lock section 68 is formed in the vicinity of an intersection between the extension direction of the bar-shaped handle 40 and the outer circumferential face of the hydrogen tank body 32 when the hydrogen tank body 32 is viewed along the length direction D. However, a lock section may be provided at any location on the outer circumferential face of the hydrogen tank body.

In the above exemplary embodiments, an example has been described in which the remaining hydrogen level display section 60 is provided to either the cover member 50 or the handle 40. However, a remaining hydrogen level display section may be provided at the hydrogen tank body.

In the above exemplary embodiments, an example has been described in which the leading end of the flow path 72 in the first connector 70 configures the supply port 74 through which hydrogen is supplied to the vehicle 10, and also configures the filler port 76 through which hydrogen is filled into the hydrogen tank body 32. However, a supply port through which hydrogen is supplied to the vehicle 10 and a filler port through which hydrogen is filled into the hydrogen tank body 32 may be provided as separate ports in the first connector. This enables a supply port and a filler port to be formed in the first connector using a simple configuration.

In the above exemplary embodiments, an example has been described in which the hydrogen tank is mounted to a small mobility vehicle that is driven autonomously by electrical energy generated by a chemical reaction between hydrogen and oxygen. However, the hydrogen tank may be mounted to a vehicle with a hydrogen engine, a hydrogen generator, a hydrogen-powered drone, or another hydrogen-powered device that uses hydrogen.

In the above exemplary embodiments, an example has been described in which the fuel tank of the present disclosure is applied to a hydrogen tank. However, the fuel tank of the present disclosure may be applied to a fuel tank that stores a fuel other than hydrogen.

What is claimed is:

1. A fuel tank comprising:
   a cylindrical fuel tank body provided so as to be detachably attachable to a fuel-powered device, the fuel tank body having one end side and another end side, the one end side and the another end side being in a length direction of the fuel tank body;
   a recess at the one end side of the fuel tank body;
   a handle formed on the one end side of the fuel tank body, the handle disposed in the recess;
   a first connector formed on the another end side of the fuel tank body and configured such that, by installing the fuel tank body to the fuel-powered device, the first connector is connected to a second connector provided at the fuel-powered device so as to enable fuel to be supplied to the fuel-powered device; and
   a cover member detachably attached to the fuel tank body, the cover member defining the recess, the cover member includes fitting holes, the handle includes claw portions that project out from outer peripheral faces of pillars of the handle, and the claw portions are received in the fitting holes.

2. The fuel tank of claim 1, wherein an end face on the another end side of the fuel tank body is formed in a flat shape.

3. The fuel tank of claim 1, wherein:
   a recess indented in the length direction of the fuel tank body is formed in an end face on the another end side of the fuel tank body; and
   the first connector is provided in the recess so as not to project out from the end face on the another end side of the fuel tank body.

4. The fuel tank of claim 1, wherein the first connector includes:
   a supply port through which fuel is supplied to the fuel-powered device; and
   a filler port through which fuel is filled into the fuel tank body.

5. The fuel tank of claim 1, further comprising a remaining fuel level display section configured to display a remaining level of fuel in the fuel tank body.

6. The fuel tank of claim 5, wherein the remaining fuel level display section is provided at a position visible from outside the fuel-powered device in a state in which the fuel tank body has been installed to the fuel-powered device.

7. The fuel tank of claim 1, wherein the cover member includes a remaining fuel level display section configured to display a remaining level of fuel in the fuel tank body.

8. The fuel tank of claim 1, further comprising a lock section projecting from an outer circumferential face of the tank body.

9. The fuel tank of claim 8, wherein the lock section is formed at a same circumferential position as an end portion of the handle, and the lock section is axially spaced from the end potion of the handle.

10. A fuel tank comprising:
    a cylindrical fuel tank body provided so as to be detachably attachable to a fuel-powered device, the fuel tank body having one end side and another end side, the one end side and the another end side being in a length direction of the fuel tank body;
    a recess at the one end side of the fuel tank body;
    a handle formed on the one end side of the fuel tank body, the handle disposed in the recess;
    a first connector formed on the another end side of the fuel tank body and configured such that, by installing the fuel tank body to the fuel-powered device, the first connector is connected to a second connector provided at the fuel-powered device so as to enable fuel to be supplied to the fuel-powered device; and
    a lock section projecting from an outer circumferential face of the tank body, the lock section is formed at a same circumferential position as an end portion of the handle, and the lock section is axially spaced from the end potion of the handle.

* * * * *